Aug. 7, 1951
C. C. BROWN
2,563,515
DRILL STEM TELESCOPE JOINT
Filed Dec. 5, 1945
2 Sheets—Sheet 1
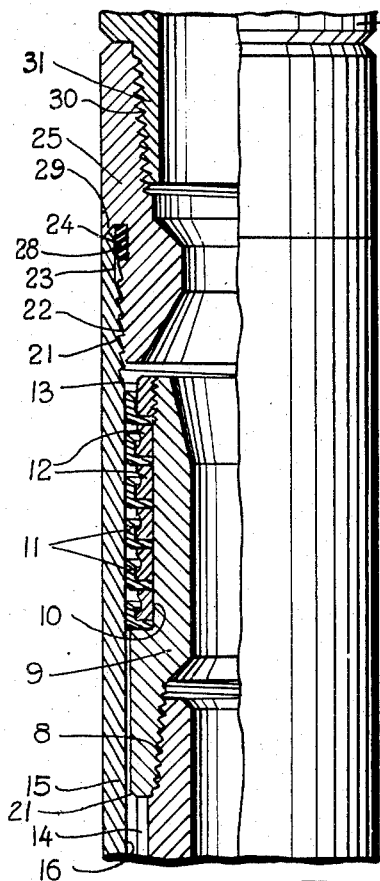
Fig.1.
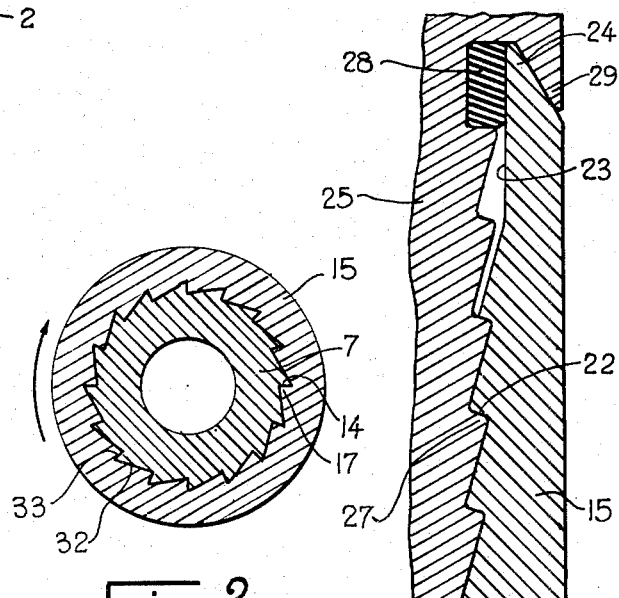
Fig.2.
Fig.3.
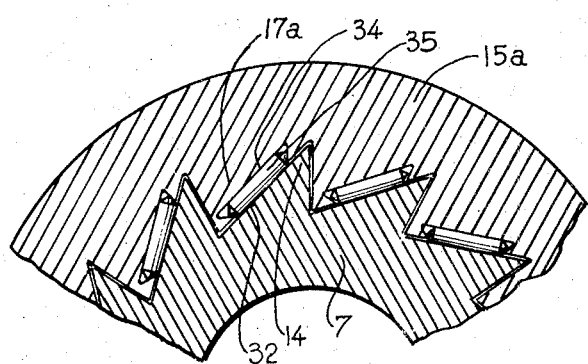
Fig.4.
CICERO C. BROWN
INVENTOR.
BY J. Vincent Martin
and
Ralph R. Browning
ATTORNEYS Aug. 7, 1951 — C. C. BROWN — 2,563,515
DRILL STEM TELESCOPE JOINT
Filed Dec. 5, 1945 — 2 Sheets-Sheet 2

CICERO C. BROWN
INVENTOR.

BY J. Vincent Martin
and
Ralph R. Browning
ATTORNEYS

Patented Aug. 7, 1951

2,563,515

UNITED STATES PATENT OFFICE 2,563,515

DRILL STEM TELESCOPE JOINT

Cicero C. Brown, Houston, Tex.

Application December 5, 1945, Serial No. 632,927

5 Claims. (Cl. 255—28)

This invention relates to a drill stem joint and has for its general object the provision of such a joint which will be trouble free and will greatly improve the efficiency of the drilling operation in which it is employed.

In drilling wells with rotary tools difficulty is encountered in maintaining a constant or uniform predetermined load on the drill bit. Also, the action of the drill bit against the bottom of the hole and the application of driving torque to the bit through the drill stem sets up vibrations in the drill stem causing it to whip and buckle, often resulting in failure. In addition, during drilling operations the neutral point in the drill stem, that is the point at which the stem is under neither tension nor compression, varies during ordinary drilling operations. Rotation of the drill stem often causes loosening or uncoupling of the joints at or adjacent the neutral point as little or no force is being transmitted through the threaded coupling. This uncoupling results in a costly fishing job and its accompanying delay. If this neutral point can be localized or confined to a certain portion of the drill stem preventive means such as lefthand threads or the like may be employed in conjunction with the joint couplings of this portion of the drill stem. This invention has to do with a method and means of solving these problems and is especially useful in drilling of deep wells.

It has heretofore been proposed that a telescope joint be inserted in a drill stem so as to make it possible to accurately determine and maintain constant the weight on the drill. However, such joints were first of all ineffective to accomplish the desired result, have not proven commercially successful because the driving parts wore rapidly, were subject to failure due to inherent weakness, the parts did not telescope and extend under torque load, but instead tended to freeze together under load, the joint was difficult to assemble and was subject to accidental disassembly in use, and much trouble was encountered in preventing leakage between the telescoping parts.

It is, therefore, an object of this invention to provide a means for maintaining a uniform drilling pressure on a drill bit and reduce to a minimum the wear on the drill stem due to buckling and whipping of the drill stem in use.

Another object is to provide a means for preventing the transmission along the drill stem of objectionable vibrations ordinarily encountered in drilling operations thus reducing the wear and tear on the drill stem and other drilling apparatus.

Another object is to provide a method of drilling with a resilient telescoping drive while maintaining a constant load of predetermined amount on the drill bit.

Another object is to provide a drill stem telescope joint which will provide maximum rotary driving strength and greater freedom from wear on the driving parts than previously proposed joint arrangements.

Another object is to provide a drill stem telescope joint which will be relatively easily telescoped or extended even while under torque load.

Another object is to provide a drill stem telescope joint which may be easily and quickly assembled without special tools yet which will not become disassembled in use.

Another object is to provide a drill stem telescope joint which will not leak.

Another object is to provide a drill stem telescope joint having a connection between the telescoping parts wherein the drive torque is transmitted through a metal to rubber or bubber-like material bearing comprising a joint readily telescoped or extended when wet.

Another object is to provide a means for localizing the neutral point in a drill stem.

Another object is to provide a fitting for a drill stem which materially reduces the eddy currents and electrolysis ordinarily encountered in drilling operations.

Another object is to provide a stripper type seal or packing for drill stem telescope joints which prevents passage of drilling fluid between the tubular parts of said joint during normal fluid circulation and permits passage of drilling fluid therebetween during reverse of circulation of fluids.

Another object is to provide a wobbly type drill stem telescope joint to dampen drill stem vibrations.

Another object is to provide a stripper type packing or seal useable in a drill stem telescope joint to prevent wear in the splines due to abrasives.

Other objects and advantages of this invention will become apparent from the following description taken in connection with the accompanying drawings wherein is set forth by way of illustration and example certain embodiments of this invention.

In the drawings:

Fig. 1 is a view partly in side elevation and partly in vertical cross section showing a splined telescope joint constructed in accordance with this invention.

Fig. 2 is a horizontal cross section taken along the line 2—2 of Fig. 1.

Fig. 3 is a fragmentary cross section on a greatly enlarged scale showing a portion of the structure illustrated in Fig. 1.

Fig. 4 is a view on a greatly enlarged scale similar to a segmental portion of Fig. 2 but illustrating a modified form of the invention.

Figure 5:
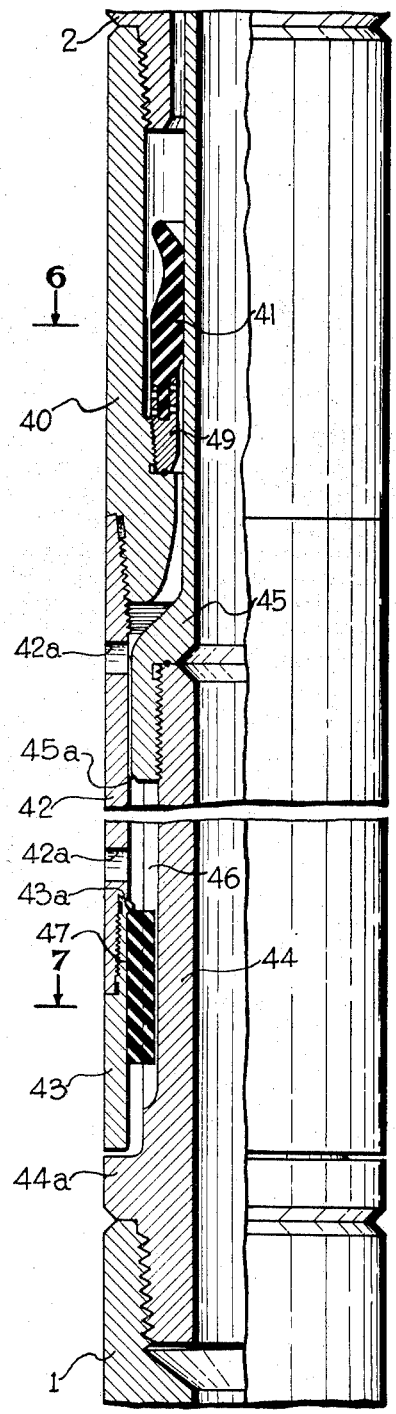
Fig. 5 is a side elevational view partially in section of a modified splined telescope joint.

Referring now more in detail to Fig. 1, the numeral 1 designates the lower portion of the drill stem which in most instances will be the usual drill collar employed on top of the drill bit. The numeral 2 illustrates the upper portion of the drill stem and may be either a tool joint on the lowermost length of drill pipe, or a second drill collar employed on the upper end of the joint of this invention for the purpose of keeping the drill stem above the same under substantial tension and thus decreasing its buckling and whipping in use.

Threadedly secured to the upper end of the drill collar 1 by means of internal threads 3 is the pin portion 4 of a fitting 5 forming a lower end portion of the tool or joint of this invention. This fitting 5 is internally threaded at 6 at its upper end to receive the threaded lower end of the splined mandrel 7. The upper end of this splined mandrel 7 is connected by means of a threaded connection 8 with the lower end of a fitting 9 which may be termed a packing carrier. This fitting 9 is formed with an upper external portion of reduced diameter as indicated at 10, and about this portion of reduced diameter are placed a plurality of cup-type sealing rings 11 spaced from each other by means of spacers 12. The entire sealing assembly is held upon the fitting 9 by means of a suitable nut 13 threaded on the upper end of this fitting.

The splined mandrel 7 is provided with external splines 14 covering substantially its entire external surface between the fittings 5 and 9 and of a configuration presently to be described. The assembly just described taken together constitute the inner portion or part of the telescope joint.

The outer part of the telescope joint is composed principally of the sleeve-like member 15 having a major portion of its length provided with a smooth internal bore 16 substantially larger than the over-all diameter of the splines 14 and of a size to snugly embrace the sealing rings 11 so as to provide a seal between the inner and outer parts of the telescope joint that will prevent any flow of fluid from the interior of the joint out between the two parts thereof to the exterior.

Adjacent its lower end the sleeve-like member 15 is provided with an inwardly projecting portion having splines 17 therein adapted to interengage with the splines 14 on the splined mandrel 7 and provide a rotary driving connection with adequate bearing area between the inner and outer parts of the telescope joint, but one which will permit relatively easy telescoping and extending of the parts with respect to each other while under torque load.

It is to be noted that the upper end of the fitting 5 provides a shoulder 18 adapted to receive the lower end of the sleeve-like member 15 and provide a stop limiting the telescoping engagement of the inner and outer parts without danger of battering the ends of the splines 17. Likewise, the sleeve-like member 15 is provided on its inner surface just above the upper ends of the internal splines 17 with a shoulder 20 adapted to receive the shoulder 21 on the lower end of the fitting 9 when the inner and outer parts of the joint are extended with respect to each other so as to form a stop limiting such extension without any danger of battering the ends of the splines 17.

The upper end of the sleeve-like member 15 is provided with internal threads 22 of the buttress type and with an internal cylindrical part 23 which is smooth and free from any obstruction whatever. The extreme end portion of the sleeve-like member 15 is beveled on its outer edge so as to provide a relatively sharp internal edge as indicated at 24.

Adapted to be connected to the upper end of the sleeve-like member 15 is a fitting 25 having external buttress type threads 27 adjacent its lower end adapted to interengage with the buttress type threads 22 on the sleeve-like member 15. Adjacent the ends of the threaded section of the fitting 25 is a part 28 which may be an insert of a relatively softer metal than the main portion of the fitting, this insert being provided with an external smooth surface adapted to receive the internal smooth surface 23 adjacent the end of the sleeve-like member 15. However, the exterior smooth surface of the member 28 is preferably made slightly larger in diameter than the internal smooth surface 23 so that when the parts are forced together there will be a press fit engagement between the smooth surfaces on the two members, to form a pressure tight seal or connection.

The fitting 25 adjacent the insert 28 is provided with an overhanging shoulder portion 29 adapted to engage the beveled end of the sleeve-like member 15 so that when the parts are forced together as when the threads 22 and 27 are fully engaged, the end portion of the sleeve-like member 15 will be drawn tightly inwardly against the insert 28. It is to be understood that while the element 28 is referred to as an insert, it may be a layer of a different type of metal from the body of the fitting 25 which layer is deposited in any manner that may be found convenient, such as by welding, brazing or the like.

The fitting 25 is preferably internally threaded at its upper end as shown at 30 so as to receive the pin portion 31 of the drill collar or tool joint 2 at the lower end of the upper portion of the drill stem.

Referring now more in detail to Fig. 2, it will be seen that each of the splines 14 on the mandrel 7 is of V-shape but is inclined with respect to a radius through its apex so that it has one long flank 32, which in the present instance acts as the driven surface, being acted upon by the correspondingly long flank of the engaging splines 17 in the sleeve-like member 15, and a relatively short flank 33. It will be readily apparent that this arrangement provides a shear area for each spline which is equivalent to the entire base of the spline, and that the total shear area for all of the splines on the element 7 is equal to the length of these splines times the entire circumference of the element 7 at the bases of the splines. At the same time, the relatively long driving surfaces 32 provide a maximum driving surface area and thus make possible a distribution of the driving load so as to reduce the unit pressure upon the driving surfaces and thereby reduce the wear upon them when the parts slide relatively to each other during the operation of the drill stem. Furthermore, the driving surfaces are kept at a sufficiently great angle with respect to the direction of application of driving force on each spline that they will not stick but will slide relatively easily with respect to each other while under torque load. Splines of the shape described may be termed buttress type splines.

Referring now to Fig. 4, there is illustrated a modification in which each of the splines 17—a carried in the lower end of the sleeve-like member 15—a is cut out to provide space at 34 for rollers 35 which will facilitate the upward and downward movement of the outer part 15—a during the time that the joint is operating under torque load. This will not only make for greater ease of operation in the sliding movement of the joint, but will tend substantially to reduce wear upon the driving surfaces of the splines 14 and 17—a.

From the foregoing it will be seen that the use of the telescope joint illustrated and described will make it possible accurately to determine the weight being placed upon a drill bit and to keep that weight constant at the weight of the drill collars 1 used on top of the drill bit plus the weight of the moving inner part of the telescoping joint. At the same time, the part of the drill stem above the telescope joint may be held relatively straight by a drill collar 2 or the like on its lower end and thus wear on the drill stem greatly reduced. Because of the presence of the easily extensible and contractible torque transmitting joint, longitudinal and other vibrations from the drill bit will be prevented from passing up along the drill stem and causing wear and tear upon the drill stem and the other equipment employed in connection therewith.

As for the joint itself, it will be apparent that the construction of the splines as illustrated in Figs. 2 and 4 will provide for the greatest possible shear area so that the splines will have the maximum driving strength for transmitting torque load. At the same time, the increase of the area of the driving surfaces of the splines will serve to reduce the unit load upon the splines and thus greatly reduce the wear thereupon and increase their life. This construction will also make for ease of telescoping or extension of the joint and this result will be greatly enhanced by the structure illustrated in Fig. 4.

The assembly of the joint may be carried out with ordinary tools as will readily be appreciated, yet the construction of the threaded joint between the sleeve-like member 15 and the fitting 25 is such that it may be easily made up yet will not disassemble in use or tend to become backed off as have certain structures of the prior art. Furthermore, it will be seen that the use of the engaging shoulder portions 18 and 19 and 20 and 21 will prevent contact of the end of the splines 17 with any parts which might seriously batter or injure them. Finally, the lip-type sealing rings 11 and their spacers 12 held in place by the nut 13 provide a readily replaceable yet thoroughly leaf-proof joint between the inner and outer parts of the telescope joint.

Figure 6:
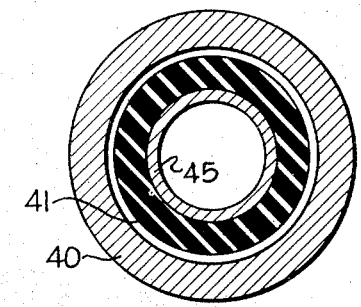
Fig. 6 is a view taken along the line 6—6 in Fig. 5 in the direction of the arrows.
Figure 7:
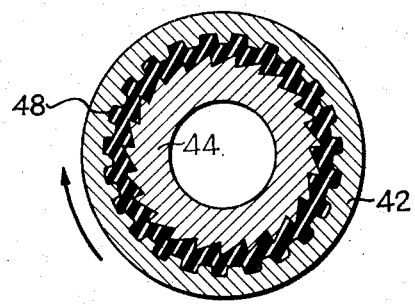
Fig. 7 is a view taken along the line 7—7 in Fig. 5 in the direction of the arrows.

Referring now to the modification shown in Figs. 5 to 7 inclusive a modified drill stem telescope joint is shown connected between drill collar 1 and the lower portion of drill stem 2. The driving torque is transmitted from the drill stem 2 through an outer part comprising a sleeve or packing carrier 40. The packing carrier has a threaded connection at its upper end with the lower end of the drill stem and carries a packing or sealing means 41 which will be hereinafter described. Threadedly connected to the lower end of the packing carrier is a tubular sleeve 42. This connection may have a conventional sealing means. The tubular sleeve has a threaded connection at its lower end with a spline carrier 43. This connection also may be sealed with packing material.

Telescoped within the outer part is an inner part threadedly attached to the drill collar 1 at its lower end. The inner part comprises a splined tubular member or mandrel 44. The lower end of the mandrel has an annular shoulder 44a which abuts against the lower end of spline carrier 43 to limit sliding movement of the mandrel in one direction within the outer part. A sealing tube 45 threaded to the upper end of the mandrel constitutes the remainder of the inner part. A seal ring may be disposed in this connection. The lower outer edge of sleeve 45 has an annular beveled surface or shoulder 45a which abuts against a beveled annular surface or shoulder 43a on the upper internal edge of the resilient spline carrier 43 to limit retraction of the inner part from the outer part.

The driving torque connection between the inner and outer parts comprises elongated axial splines 46 on the outer periphery of mandrel 44. These splines are V-shaped and may be referred to as buttress type splines. Splines 46 are interengaged with splines formed on the inner periphery of an annular web of resilient material 47. This web of material is well bonded to the inner surface of the resilient spline carrier 43. To increase the bonded area between the carrier 43 and the web of resilient material a toothed engagement is provided therebetween and is best shown in Fig. 7 as indicated at 48. It is to be noted that the area of the driving face or surface between the splines is greater than the area of the other face or surface as in the embodiment of the invention previously described. Also, as in the other modification, the V-shaped splines provide a maximum shear area.

The splines 46 are relatively longer than the resilient splines on the web of material 47. This permits a relative sliding movement between or telescoping of the parts although the parts are held against relative rotation. The resilient web may be made up of synthetic rubber such as neoprene, natural rubber or the like. This joint is well lubricated during operation by the water within the bore hole such as the drilling mud or fluid. The drilling mud has access to the space between the inner and outer parts through ports 42a in sleeve 42. The friction between rubber-like material and metal surfaces when wet is of a very low order and is substantially less than that of metal to metal surfaces, utilizing present day lubricants. Thus with this type tool the inner part slides readily relative to the outer part as the hole is drilled whereby a constant and predetermined load is imposed upon the drill bit. The resilient web also provides a cushioning effect absorbing or dampening to a great extent the vibrations usually encountered in the drill stem during ordinary drilling operations with conventional tools.

A seal is provided between the inner and outer parts adjacent their upper end. The seal means or packing comprises an annular stripper-type sealing means 41 moulded on the packed carrying sleeve 40 by means of a ring 49 threaded thereto. The packer encircles and is in sliding engagement with the outer periphery of seal sleeve 45 of the inner part. The outer surface of the packer has a greater area than its inner surface and thus the pressure of the drilling fluid in the annular space between sleeve 40 and sealing sleeve 45 collapses the packer into sealing engagement with the sealing sleeve 45 when the fluid or mud circulation is in its normal direction. On reversal of the direction of the flow of drilling mud the fluid will pass by the stripper packer and flow between the inner and outer parts. The packer together with the resilient splines afford a resilient or wobbly connection between the inner and outer parts of the joint. In addition, they afford a joint in which the inner and outer parts are insulated from each other reducing the intensity of electrical eddy currents which are normally encountered in drilling operations.

The primary advantages of this modification are that a wobbly joint is had in which the inner and outer parts are insulated from each other reducing the vibrations and eddy currents encountered in drilling with conventional tools. This wobbly joint materially reduces the tendency of the drill stem to buckle and whip on rotation. In addition the substantially frictionless engagement between the resilient and metallic splines makes for constant and uniform distribution of the bearing load upon the drill bit during drilling operations as the inner part is substantially free to move axially of the outer part even during the application of a driving torque between the parts.

A means has thus been provided for carrying out and accomplishing all of the objects and advantages sought by this invention.

Having described my invention, I claim:

1. A wobbly type drill stem telescope joint comprising telescoping tubular parts, adapted to be connected to upper and lower portions of a drill stem respectively, longitudinally extending interengaging splines slidably and nonrotatably joining the parts together, the splines of one of said parts made up of a web of resilient material well bonded thereto, ports in the wall of the outer part communicating between the parts, an annular strip of resilient sealing material encircling the inner part and fixed at its lower end to the outer tubular part, said ports being located intermediate said splines and said sealing strip, said seal being of lesser external diameter than the internal diameter of said outer tubular part and forming an annular space therebetween whereby said seal is in engagement with the inner part to prevent passage of drilling fluid between the telescopic parts during normal downward circulation of said fluid and permits passage of fluid thereby on reverse circulation of the drilling fluid while functioning to permit lateral movement of the parts relative to each other.

2. A wobbly type drill stem telescope joint as set forth in claim 1, wherein each spline is generally V-shaped in cross-section with a long flank and a short flank and with the long flanks of the interengaging splines having contact with each other and forming the primary driving surface to transmit rotary motion from one part to the other.

3. A wobbly type drill stem joint including, an outer tubular housing having its upper end adapted to be connected with a drill stem, an inner tubular mandrel telescoping the housing and having its lower end adapted to be connected with the drill stem and having its upper portion of reduced diameter, longitudinally extending interengaging splines between the lower end of the outer housing and the inner tubular mandrel, the splines on the housing being constructed of an annular web of resilient material bonded thereto, an annular sealing sleeve having its lower end anchored to the bore of the housing and surrounding the reduced upper portion of the mandrel, whereby drilling fluid circulated downwardly through the drill stem and housing may act upon the sleeve to urge it into sealing engagement with the mandrel, said sleeve having an external diameter less than the bore of the housing whereby lateral movement of the mandrel relative to the housing may occur without breaking the sealing engagement of the sleeve with the mandrel.

4. A wobbly type drill stem joint as set forth in claim 3, wherein the housing has an opening in its wall below the sealing sleeve to establish communication with the interior of the housing below the sealing sleeve and the space outside of said housing, whereby flow upwardly through the sleeve may occur when a circulation of fluid is directed from outside the housing and into the bore of said housing upwardly past said sleeve.

5. A wobbly type drill stem telescope joint comprising telescoping tubular parts, adapted to be connected to upper and lower portions of a drill stem respectively, longitudinally extending interengaging splines slidably and nonrotatably joining the parts together, the splines of one of said parts made up of a web of resilient material well bonded thereto, said outer tubular part having an opening in its wall establishing communication between the area exteriorly of said outer part and the space between the inner and outer parts, an annular sealing element encircling the inner part at a position above the opening in said outer part, means for anchoring the lower end of the sealing element to the outer part, at least the upper portion of the sealing element having an external diameter less than the internal diameter of the outer part to form an annular space therebetween whereby the sealing element is maintained in sealing engagement with the inner part to prevent passage of drilling fluids downwardly between the inner and outer parts during normal downward circulation of said fluid and permits upward passage of fluid between the parts upon reverse circulation of the drilling fluid.

CICERO C. BROWN.

REFERENCES CITED

The following references are of record in the file of this patent:

UNITED STATES PATENTS

| Number | Name | Date |
|---|---|---|
| 581,476 | Blanton, Jr. | Apr. 27, 1897 |
| 1,609,851 | Wilson | Dec. 7, 1926 |
| 1,737,503 | Mercer | Nov. 26, 1929 |
| 1,767,350 | Crowell | June 24, 1930 |
| 1,779,805 | Dunwoodie | Oct. 28, 1930 |
| 1,844,257 | Lincoln | Feb. 9, 1932 |
| 2,199,926 | Swennes | May 7, 1940 |
| 2,202,261 | Osmun | May 28, 1940 |
| 2,212,153 | Eaton et al. | Aug. 20, 1940 |
| 2,233,692 | Bryant | Mar. 4, 1941 |
| 2,240,519 | Reed | May 6, 1941 |
| 2,325,132 | Haushalter et al. | July 27, 1943 |
| 2,463,353 | Brown et al. | Mar. 1, 1949 |

OTHER REFERENCES

Marks' Handbook, 4th edition, page 896, Fig. 8, McGraw Hill Publishing Co.